United States Patent [19]

Donnelly et al.

[11] Patent Number: 6,100,885
[45] Date of Patent: *Aug. 8, 2000

[54] SUPPORTING MODIFICATION OF PROPERTIES VIA A COMPUTER SYSTEM'S USER INTERFACE

[75] Inventors: Vanessa Donnelly, Coventry; Raymond Trainer, Warwick, both of United Kingdom; Arthur Thomas Jolin, Chapel Hill, N.C.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,093

[22] Filed: Mar. 3, 1997

[30] Foreign Application Priority Data

Jul. 6, 1996 [GB] United Kingdom ............ 9613767
Jul. 20, 1996 [GB] United Kingdom ............ 9615293

[51] Int. Cl.⁷ ..................................... G06F 3/00
[52] U.S. Cl. ........................................ 345/333; 709/303
[58] Field of Search ........................ 345/326, 333, 345/334, 339, 352, 356, 970, 966, 968, 967; 707/100, 102, 103; 395/701, 683, 680; 709/303, 300

[56] References Cited

U.S. PATENT DOCUMENTS

| | | | |
|---|---|---|---|
| 4,692,858 | 9/1987 | Redford et al. | 345/333 |
| 5,347,627 | 9/1994 | Hoffmann et al. | 345/334 |
| 5,461,710 | 10/1995 | Bloomfield et al. | 345/349 |
| 5,483,654 | 1/1996 | Staron et al. | 345/353 |
| 5,680,559 | 10/1997 | Chew et al. | 345/335 |
| 5,682,510 | 10/1997 | Zimmerman et al. | 345/352 |
| 5,682,532 | 10/1997 | Remington et al. | 709/303 |
| 5,754,174 | 5/1998 | Carpenter et al. | 345/334 |
| 5,758,348 | 5/1998 | Neubauer | 707/103 |
| 5,872,974 | 2/1999 | Mezick | 395/701 |
| 5,892,512 | 4/1999 | Donnelly et al. | 345/349 |
| 5,946,696 | 8/1999 | Young | 707/104 |

FOREIGN PATENT DOCUMENTS

| | | |
|---|---|---|
| 0628904 | 12/1989 | European Pat. Off. . |
| 0409588 | 7/1990 | European Pat. Off. . |
| 0445769 | 6/1991 | European Pat. Off. . |
| 0472444 | 8/1991 | European Pat. Off. . |
| 0540925 | 10/1992 | European Pat. Off. . |
| 0585131 | 8/1993 | European Pat. Off. . |
| WO92/12488 | 7/1992 | WIPO . |
| WO94/15273 | 7/1994 | WIPO . |

OTHER PUBLICATIONS

"Patents in Practice: A property template for C++" by Colin Hastie, C++ Report Nov.–Dec. 1995, vol. 7, No. 9, pp. 29–33 and 69.

Primary Examiner—Crescelle N. Dela Torre
Attorney, Agent, or Firm—David A. Mims, Jr.

[57] ABSTRACT

A set of object classes provide a framework supporting user modification of user interface properties. The classes include a properties class which is a template for creation of property objects encapsulating property values and the view attributes (GUI information) required for creating views of the property via a user interface. Property objects provide a single mechanism for representing a particular property, allowing a number of different views to be open on the same property. User interactions with different views of a property via the user interface result in messages being sent to the same property object. If a property value is changed, then the chance is propagated back to all associated applications having views for the object and so view concurrency is automatically achieved.

2 Claims, 9 Drawing Sheets

SUPPORTING MODIFICATION OF PROPERTIES VIA A COMPUTER SYSTEM'S USER INTERFACE

FIELD OF INVENTION

The present invention relates to computer systems having user interfaces through which a user can select and modify properties associated with components or applications, and to the development of components or applications which support user-modification of properties.

The term 'component' is used herein to refer to a functional software element of an application program. Components are generally small, self-contained and functional software elements which can be used within a number of different application programs to perform the same function. Components typically implement user-oriented tasks, such as printing for example. A printing component may form a standard building block for applications, and be called each time one of these application programs is run and requires the print operation to be performed. As another example, a calendar facility may be implemented as a component. Building applications from such 'shareable' software components is becoming increasingly common, particularly but not exclusively when using object oriented programming techniques.

BACKGROUND

User interfaces are the means by which a computer user interacts or communicates with the computer system. User interfaces are typically implemented with a display screen and a user-controlled input device such as a keyboard, mouse, microphone, light pen, or the like. The display screen displays information to the user and the user uses the input device to issue commands and provide information to the computer system.

As computers have become very widely used in recent years, much work has been done on the development of user interfaces which do not require users to know large numbers of specific and complex commands and syntax rules. For example, graphical user interfaces (GUIs) which are in common usage present to the user on a display screen a plurality of icons which are small stylised representations of computer system entities (applications, folders, etc) and actions (print, save, cut, paste, etc). A user can select and work with an icon via an input device (for example moving a cursor using a mouse so as to point to a required icon and then clicking a mouse button) without needing to remember and type specific commands to select and invoke the associated action or entity. The system is programmed to recognise the mouse click as a selection. Typical GUIs present icons within tool bars and in the client area of windows (the area reserved for displaying information to the user).

An icon in a tool bar is just one example of the general requirement for a user interface to enable users to select and invoke particular operations on the computer system and to select and modify particular properties. In a typical user interface environment, operation selection may be achieved by defining 'actions' which the user can select via 'views' of those actions provided via the user interface. An action in this context can be defined as a user initiated event which invokes an operation. In addition to the ability to select and invoke operations, users also require the ability to select and modify certain 'properties' such as to select text fonts, colours of displayed graphics, audio volume, or criteria to be applied in a search operation. 'Properties' can be defined as data attributes associated with particular components or applications. A property may be any data attribute in a computer system and most applications have a large number of properties associated with them, but property data is typically related to configuration of the application as in the example of the font of a block of text. Taking one example, the code controlling a computer system to automatically display help text as a cursor is moved across a screen (known as 'Hover Help' or 'Bubble Help') is known to be implementable as a component. The Hover Help component may have a number of properties such as the font of its help text, the colour of the text, the background colour of the 'bubble'. References herein to modifiable properties are to properties having user-modifiable values.

The 'views', used to represent an action or a property within the user interface may take a number of different forms, both visual and non-visual. Typical examples of visual views used in GUIs are a word or phrase on a menu bar (as illustrated in FIG. 9a where the 'Print' action is selected from a word view), a graphical representation such as an icon or bitmap on a tool bar (as illustrated in FIG. 9b where the 'Print' action is selected from a print bitmap view), or other visual controls that enable user selection or input. Examples of such other controls are a combination box control that allows selection of a font property (as illustrated in FIG. 9c), or an entry field that allows the setting of a string property such as setting the name of a directory or a tool bar name (as illustrated in FIG. 9d). These controls could appear anywhere within the user interface. Further examples of visual views are illustrated in FIG. 9e, where the print action is selectable from a context menu displayed by depressing the right mouse button whilst the cursor is positioned over the window area, and in FIG. 9f where the print action is selectable from a push button view in a window layout.

Examples of non-visual views could be accelerator data selectable by accelerator key sequences using a keyboard (generally a short sequence of key strokes defined to invoke an operation, such as 'Ctrl+P' used to select a print action), speech pattern data selectable by speech input, or gesture data selectable by input gestures such as the stroke of a pen on a tablet. Hereafter, all such mechanisms for selecting actions or properties will be referred to as 'views' whether they are visual or non-visual. Menu lists, toolbars, accelerator tables, edit fields and windows which portray properties and actions are referred to generically herein as 'item lists' or as action/property 'viewers'. Individual item lists each have a type (e.g. a toolbar is a type of item list or viewer) and a list of zero or many 'items', which items may be actions, properties, or other item lists.

Currently, when developing application programs, a significant amount of developer effort is required to provide the functionality enabling user selection and invocation of actions or user selection and modification of properties within an application program. Additionally, there is a significant problem in achieving user interface and functional consistency between and within applications that display different views of properties (or actions) which views are perceived by the user as being the same. Different views that appear to be the same may have quite different code implementations, and some applications will allow certain functions which others do not.

A major reason why providing this support is so time consuming for the developer is that there are often required to be a number of different places within an application where the user can select the same action or property, and a number of views of a particular action or property available for selection by the user in different places within the user interface. The developer is required to write separate control code for each of these views. Views on properties include those found within drop-down lists, sets of radio buttons, check boxes, edit fields, etc. Views on actions typically also appear as items within drop-down menu lists, and as tool bar buttons, and within context menus. Within some applications there are also many places where the user is presented with a push button that opens a dialog or window. An example of the above is where a user can select a print option from a menu bar pull down list, a tool bar button on a tool bar, an entry in a context menu, or a push button on a dialog. Essentially the same operation of opening a print dialog occurs, but the visual appearance and implementation of the selection mechanisms are different to achieve the same result.

In addition to requiring application developers to write code to enable access to actions and properties from multiple places, users may also require the developer to provide different action and property views depending on the type of viewer (e.g. a bitmap representation may be wanted in a toolbar whereas a text identifier may be preferred in a menu list, both because of space constraints and for consistency of presentation with other items in each viewer). Further requirements may include the need for property values to be persistent (to be saved across sessions even when the computer is switched off) and an ability for the user to move or copy views of properties to more convenient places within the user interface (e.g. using a drag and drop mechanism or clipboard). For each property for which such user-modification features are required, the application developer's task currently includes at least:

defining a set of attributes for the property;

defining the interface controls that the user has to interact with to access the attributes;

providing the logic that responds to a user selection when an interaction occurs;

providing a persistence mechanism that allows attributes to be stored persistently and to be restored with the same values when the application is subsequently restarted.

If more advanced user interaction is required or the developer wishes to provide the capability of applying more complete selection mechanisms on a visual property, then the developer has to provide much more advanced logic. For example, providing concurrency of both the value and state (such as whether it is modifiable) of a property wherever it is used in the application, whether by the application logic or the end user, or enabling users to drag views of properties to other property viewers would each entail significant further work for the application developer.

Currently, there is no help for developers who wish to enable end-user modification or customisation of properties within their applications and the development effort required to provide a flexible solution is considerable.

A further consideration which increases the amount of effort required by the developer is that there are a number of different input mechanisms that can be employed by the user to select the same action or property. The standard point and click mechanism of the mouse is well understood, and this would be the typical mechanism used to select visual views displayed via the GUI. However, a number of actions also have accelerator options that allow selection via a specific character on the keyboard (eg 'P' for selecting the 'Print' action). Further, speech enabled applications allow the user to speak commands, so that for example the user can say 'Print' to open the print dialog, and if a pen gesture has been defined for opening a print dialog, pen enabling will add another view that may be available for the user to select the action.

Additionally, there are situations where small interface behaviours are so pervasive that the same piece of code is written repeatedly throughout an application. An example of this is when an application has a number of dialog type windows that allow the user to cancel out of the window without applying any changes. The visual representation of this function may, for example, be a 'Cancel' push button, but usually there is also a keyboard mechanism to achieve the same result, for example selection of the 'Esc' key. Traditionally the developer would have to code three things to achieve this function, namely: a) to provide a push button on a dialog; b) to add the escape accelerator to the accelerator table; and c) to provide the cancel procedure within the application code. These three stages would normally be repeated every time the escape function is needed for an individual window.

The application developer thus currently has to write a significant amount of code to fully support the various required views of actions and properties, and to support modification. When new technology is introduced (e.g. speech) additional work is required to make that new selection mechanism available to the user. Since there are a number of permutations for the developer to remember, there are times when certain selection mechanisms are not enabled within products. This leads to usability problems across products, where one application works one way, and another does not. Added to this, the various views on the same actions and properties usually are constructed in a number of different ways, and once constructed have little to no user-customisation capabilities and can only be extended to satisfy future requirements with considerable extra effort.

It is an object of the present invention to provide a system and a method which alleviate at least some of the above identified problems.

Copending UK patent application number 9613767.4, which is incorporated herein by reference, discloses support for different views of actions by use of a single generic mechanism for dealing with actions. An action object defines, for each available view that can be used to represent an action, the attributes required to provide that view and an identifier to identify the operation to be invoked upon selection of the action. Copending UK patent application number 9615293.9, which is also incorporated herein by reference, discloses provision of a note pad object accessible from an action palette which allows a user to create new user pages into which commonly used properties and actions can be placed.

SUMMARY OF INVENTION

In a first aspect of the present invention, there is provided a computer system having a user interface through which a user can change values of properties associated with components or applications, the properties being selectable by one or more views provided via the user interface, wherein the system includes:

means for identifying certain user interactions as requests to change a property value; and means for managing properties as property objects of a properties class, the property objects encapsulating property values and view attributes for providing said one or more views, the managing of property objects including changing an encapsulated property value in response to said change requests.

The managing of property objects preferably includes automatically notifying all associated components or applications, and updating respective property views, when a property value is changed. Without such notification, any associated component would have to repeatedly poll its property objects to check for changes.

The means for managing property objects is preferably implemented as a generic object oriented 'framework' comprising a set of object classes and their defined interrelationships. The object classes include a properties class which has property objects as instances of the class. Each property object encapsulates view attributes required for providing one or more views of the object via the user interface and has a data value, and preferably also has a defined property type and data type. Most properties have user-modifiable values and the means for managing property objects includes means for updating encapsulated property values in response to application requests and then automatically notifying associated components or applications. In a preferred embodiment of the invention, the components and applications identify themselves as 'observers' of the property object—indicating to the property object that they require notification of updates to it.

According to a preferred embodiment of the invention, a property object for a visual property unifies data and the GUI information controlling how that data item can be accessed by an end user.

The means for managing property objects preferably includes means for generating property objects, for a plurality of components or applications associated with the framework, in response to requests from said components or applications. Property objects are preferably created at application start-up and the application subsequently uses these objects as mechanisms for providing property views and for working with property values.

Use of a generic framework having means for providing and managing property objects representing user interface properties, which framework is available for use with many applications or components, has a number of significant advantages for both application developers and end users. Firstly, the task of application development is greatly simplified (reducing development costs) by the encapsulation of predefined view attributes and user-modifiable values associated with components. The developer does not have to provide complete view definitions himself, and the framework automatically handles view concurrency so the developer does not have to provide additional code to achieve this. That is, changes to property values or state made via interaction with any one property object view are changes to the same property object and automatically result in all views being updated. In prior art computer systems, views of properties are separately coded and the program code written for a specific view is responsible for its respective view attributes, rather than the view attributes being owned by property objects as in the present invention. As well as achieving consistent responses to user interactions within the scope of a single application, user interface consistency between different applications is also achieved since the framework is available for use with many applications.

In a preferred embodiment, much of the logic for responding to user selection of views is also provided by the framework and so does not have to be provided by the application developer. Developers can work at a level of abstraction above GUI controls when defining properties, and responses to user interactions will be consistent. Furthermore, the object-oriented framework design simplifies application code organisation which reduces maintenance and debugging overheads.

The invention enables separation between a data model and views for properties, such that different views can be used on the same model data—the model holds the data but each view can request a change to the data value. The property performs the change and notifies all the components with which it is associated (unless some components do not require notification). This updates all of the views that are open upon the property object. This support for multiple views of properties routing changes to the same property object achieves functional consistency throughout the user interface and concurrency of property value and state, without imposing constraints on the property views that can be added.

It is a second aspect of the invention to provide a computer program product comprising computer program code recorded on a data carrier, for use with a computer system providing a user interface for user interaction, the computer program product including means for managing properties as property objects encapsulating property values and view attributes for providing one or more views of the property via a user interface.

The computer program product according to this aspect preferably provides support for both developing applications which support user modification of properties and for runtime modification of properties in response to user interaction. The program product's set of object classes include a set of particular abstractions including property object definitions that can be used to simplify application program development, saving development time (and so reducing costs) and yet enabling increased interface functionality.

In a preferred embodiment of the invention, the framework includes a predefined set of view attributes for a standard set of visual property views for certain user interface property types, and so application developers using the framework do not have to define view attributes for the standard visual views. As well as simplifying development, this enables developers to create application suites which have commonly defined and registered "standard" properties, providing consistency in how application-specific functions and data appear in the applications within the suite. This can be very important, since end-users require such consistency and do not want to have to separately learn and remember different methods of interaction with each application within a suite.

The framework of the preferred embodiment also supports user definition of unique views. That is, if additional non-standard views are required, providing these is simplified by the framework since the developer merely provides the new view attributes and an identification of when this view is to be used. Additional steps to these would be required in standard coding techniques. Defining views preferably involves storing the view attributes in association with a label (such as "ToolBarGraphic") which can be included within application code to specify the view required at that point in the program. An example situation where a developer may wish to create unique visual property view is where the developer wishes a window view to show a latchable button instead of a check box (see FIGS. 5a and 5b). Secondly, a developer may wish to define a property for a type that is not in the supplied list of standard properties (for example a property based on a Date type) including defining its view attributes.

The framework according to a preferred embodiment provides support for direct manipulation of property objects for both end users and application developers. A user is enabled to drag a copy of a property view from a dialog or settings notebook page and promote the property to a toolbar. The 'drag and drop' function is well known in the art. However, when implemented with the framework according to the present invention, this operation opens a new view on the single property object, and so all of the functionality associated with the property object (management of updates and concurrency, etc) is automatically associated with the new view.

In a preferred embodiment, the set of classes within the framework includes a Property class, an Action class and an ItemList class which each inherit from a base Item class that is 'typed'—i.e. each property, action or item list has a recognisable type that can identify what kind of item it is. An example of a property type is a 'Font Selector'. There may be any number of font selector property instances within a component or application that select fonts for different parts of the interface, but they would all have the same type. In addition to its type, each item also has appearance data or view attributes which, in the preferred embodiment, comprise labelled attributes that can be associated with an item type. Example labels are "Text", "ToolbarGraphic", and "HoverHelp". The view attributes are stored in an AppearanceData class (referred to herein as the view registry) within the framework, keyed by type, so that the type of an item determines which view attributes are used for it. Thus items of the same type will typically be displayed with the same view attributes.

Visual property objects are different in nature to action objects (discussed in detail in copending UK patent application number 9613767.4) as they manage a piece of data. The data can be of any data type or object type, but the type of data that the property represents can in the majority of cases predict the kind of views that can be provided for it. Because of this, it is advantageous to implement the invention within a generic visual property framework that provides a standard set of views for a set of standard data/object types. A generator within the framework preferably provides property objects with a standard set of predefined property view attributes for a standard set of views.

Furthermore, because property objects according to the preferred embodiment are typed (i.e. associated with a type identifier), it is possible to create a single property view representing a plurality of property objects based on the type identifier. This is especially useful in the environment of component programming where a number of components may be selected, in that it enables presentation of a single dialog or settings page that is applicable to all selected components. Using the properties framework according to a preferred embodiment of the invention, the properties within all settings pages can be merged, and where properties are of the same type a merged visual property view can be generated to represent this plurality of different property instances. Changes to this merged property view are automatically propagated to the original properties and thus to each selected component. This greatly increases the useability of the interface and reduces the number of steps the user has to go through to change settings.

The merging of properties into a single interface as a single merged settings or property view is not supported in prior art systems, and so different settings views have to be opened by a user who then has to determine which settings view goes with which component, and then go to each settings or property view to change the settings for that component.

According to a further embodiment of the invention, an application developer framework supports the building of multiple views of properties and the opening of views onto item lists independently of the components or applications to which the property data relates, including a facility for formatting an hierarchical list for presentation by an item list view.

A properties framework according to a further embodiment of the invention supports storing of previous user entries, and dynamically adding these previous choices to a selectable list. Addition of such 'intelligence' to a type of property can greatly increase the useability of an interface. An example implementation of this is controlling a file open dialog to remember and display to the user the last five locations that the user opened files from. In prior art systems, such support would have to be coded repeatedly within each application.

BRIEF DESCRIPTION OF DRAWINGS

The present invention will be described hereafter in more detail, by way of example, with reference to a preferred embodiment as illustrated in the following drawings.

DESCRIPTION OF PREFERRED EMBODIMENTS

Figure 1:
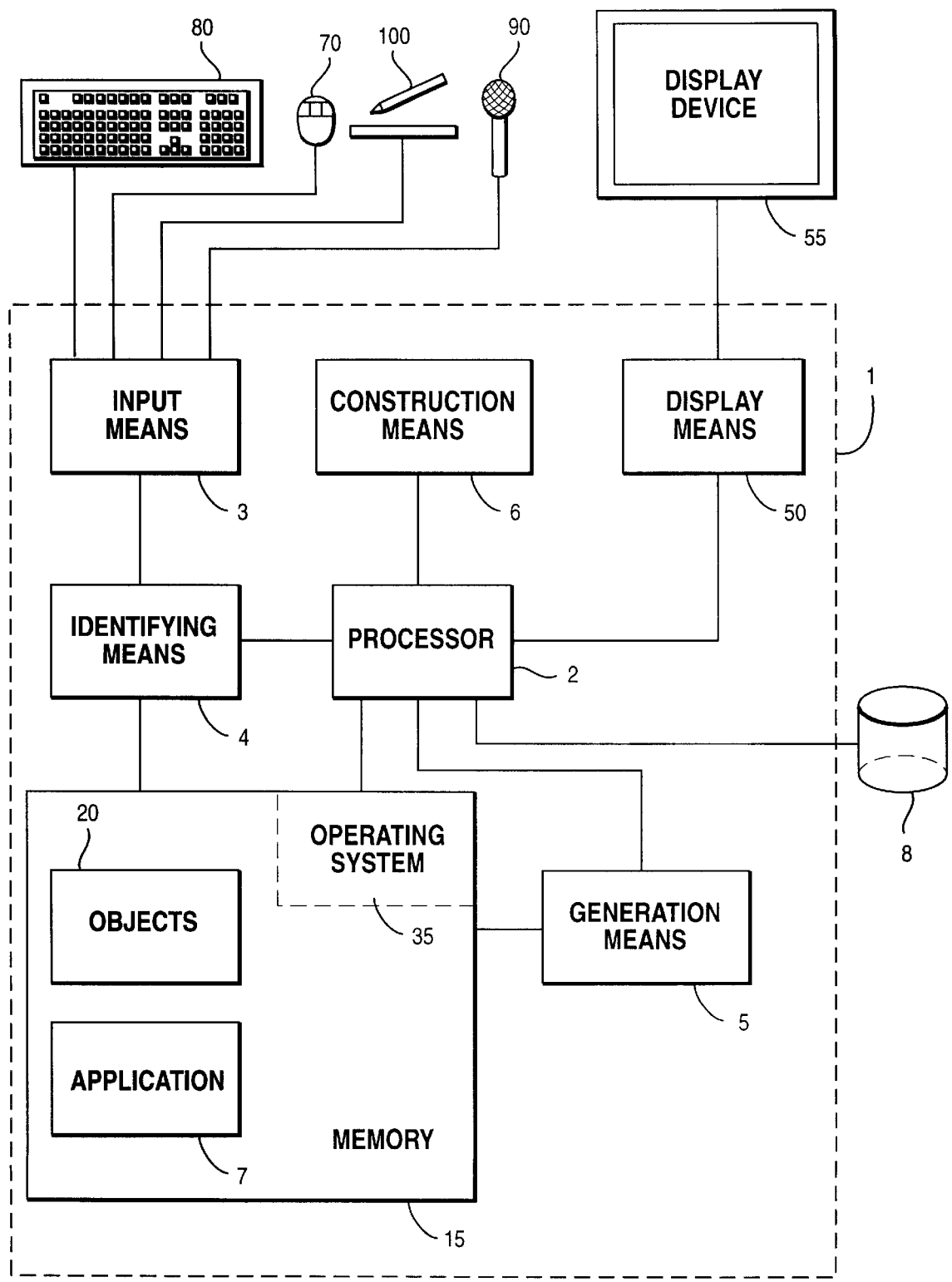
FIG. 1 is a schematic diagram of the main functional elements of a system in which the invention is implemented according to a first embodiment.

A system according to a preferred embodiment of the invention will be discussed with reference to FIG. 1, which is a block diagram showing the main functional elements of a system in which the invention is implemented. FIG. 1 illustrates a typical computer system 1 having an operating system 35 installed on the computer system, a central processing unit 2, memory 15, a storage device 8 which may be incorporated as part of the system or accessed remotely, and a display device 55 connectable to the computer system.

The processor 2 is arranged to pass data to the display means 50 for display on the display device 55. Since the operation of a typical display means is well known in the art, it will not be discussed in any further detail herein. It suffices to say that it encompasses the various software and hardware components used to pass data to the display device 55. In the IBM OS/2 operating system, a layer of OS/2 called Presentation Manager is the software used for this purpose.

In the preferred embodiment of the invention, a standard GUI is displayed on the display device 55 presenting the user with a number of windows and icons. A software application 7 is associated with one or more of these windows in the GUI. To enable the user to interact with the application 7 so as to invoke particular operations, the GUI preferably provides visual views of certain actions which the user can select. The GUI also preferably provides visual views of certain properties enabling the user to modify the property values. In addition, certain non-visual views such as accelerator data within an accelerator table may enable the user to select keyboard characters to invoke actions and hence the corresponding operation.

Users can interact with the views via an appropriate input device connected to the computer system 1. Examples of such input devices are a mouse 70, a keyboard 80, a microphone 90, or a pen 100. As will be appreciated by those skilled in the art, for visual views such as buttons, menu bars and tool bars, the user would typically use the mouse 70. However, the user may also choose to select actions or properties via key entries on the keyboard 80, gesture entries via the pen, or voice entries via the microphone. However the input signal is generated, it is received by the input means 3, and is then passed on to the identifying means 4 for analysis. As will be appreciated by those skilled in the art, the function of the input means 3 is typically provided by the operating system/GUI of the system, for example the mouse driver code in the case where the input device is a mouse. The identifying means 4 is preferably a software process executed under the control of processor 2 to identify whether the input signal corresponds to a selection of a particular view of an action intended to invoke an operation, or corresponds to a request to modify a property. In the preferred embodiment of the present invention, this identification function is performed by logic within an actions and properties framework, which will be discussed in more detail later with reference to FIGS. 2 to 4. However, it is not necessary to provide this function as part of the framework and, as will be appreciated by those skilled in the art, the identifying means 4 can alternatively be provided elsewhere in the system.

FIG. 1 includes a block 20 representing objects stored in memory 15. Object Oriented Programming (OOP) is a particular approach to software development which implements required functions by way of 'messages', sent to 'objects'. An 'object' is a software package that contains a collection of data and related software procedures (often called 'methods') which operate on that data. Typically, objects are created as instances of a particular 'Object Class', the class being a template for defining the procedures and data for a particular type of object. A 'message' is a signal sent to an object to request that object to carry out one of its procedures. Hence a message sent to an object will cause a procedure to be invoked to implement the required function.

An OOP object provided for the management of properties in accordance with the preferred embodiment of the present invention will be referred to herein as a 'property object'. This will be described in more detail below with reference to FIG. 3. An OOP object provided for dealing with actions will be referred to as an 'action object'.

The system includes a generation means 5 for creating property objects within the system memory 15. An application developer is enabled to define required objects and to register them for subsequent use by the application 7. The generator means creates property object instances when required. In the preferred embodiment of the invention, the generation means is provided as part of the actions and properties framework, which will be described more fully later with reference to FIGS. 2 and 3.

The system of the preferred embodiment further comprises a construction means 6 which, under the control of the processor 2, is used to create collective views from item list objects 20 stored within the memory 15. Item list objects, like action and property objects, are created by the generation means 5, and the construction means 6 is then used to produce collective views such as tool bars, menu bars, and accelerator tables from those views. One key advantage of this embodiment of the invention is that the same item list can be used to construct a variety of collective views representing the same set of actions and properties in this view's unique manner; the developer no longer needs to write separate application code for each collective view.

In preferred embodiments, the construction means 6 is also part of the actions and properties framework, but it will be apparent to those skilled in the art that this function can be provided elsewhere. All that is required is to provide some function to construct the collective view from the definitions in the item list object.

Figure 2:
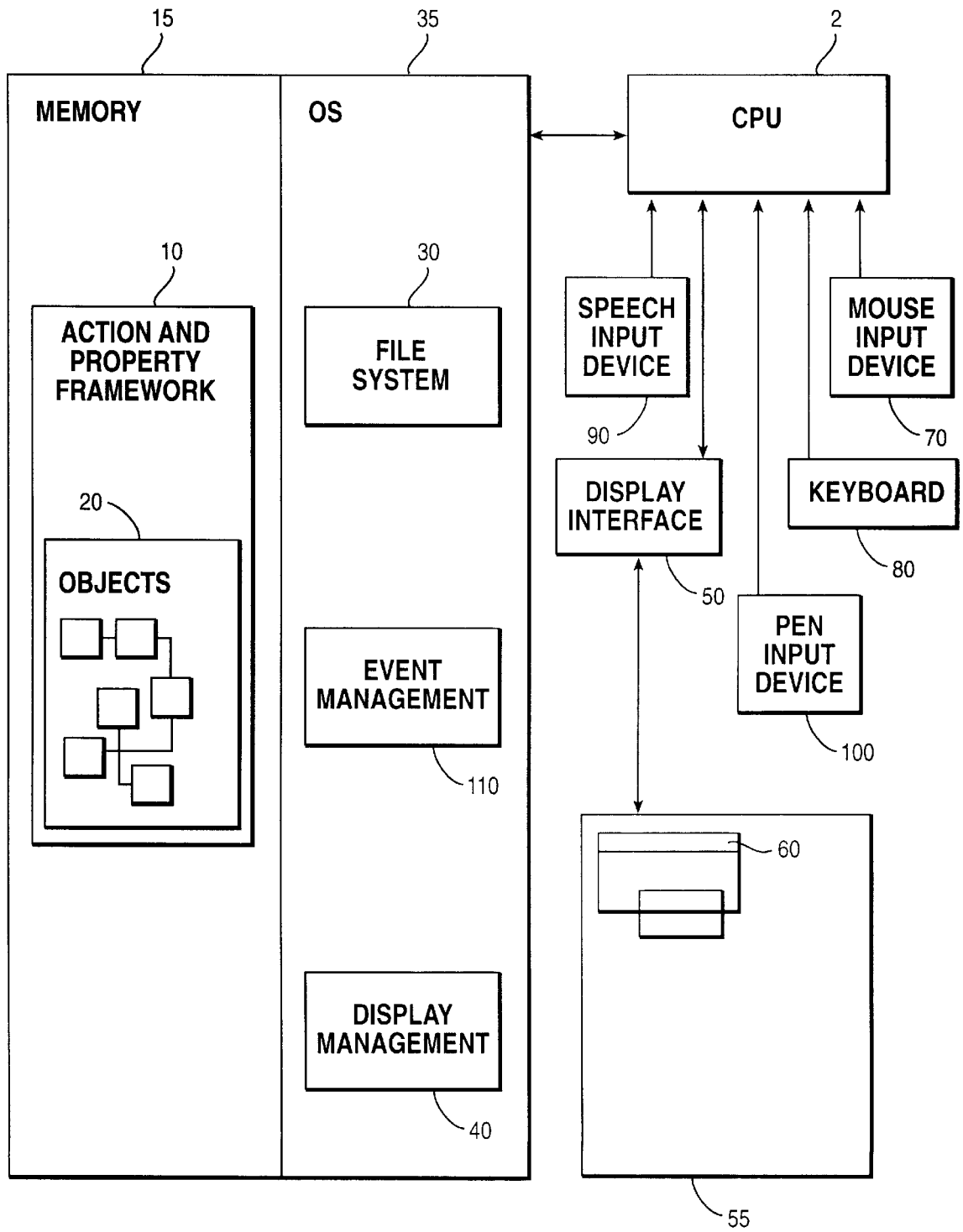
FIG. 2 is a second schematic diagram showing functional elements of the system.

The system of the preferred embodiment will now be discussed in more detail with reference to FIG. 2, which is a block diagram showing some of the main functional elements of the system. As mentioned earlier, the system includes an actions and properties framework 10 that comprises a set of base objects 20 that can be logically 'wired together' with application code for performing a task. The framework 10 uses the underlying file system 30 of the operating system to load from system storage and store in memory 35 the various objects that exist within the framework 10.

Once the item list objects, property objects and action objects required by a particular application have been constructed, the display management system 40 of the operating system (provided by 'Presentation Manager' in IBM's OS/2 operating system) is used to create the necessary signals for the display interface 50 to display the views of those objects on the display device 55. Typically, these views would be displayed in a GUI windowing interface 60. However, with the introduction of new input and output mechanisms such as speech, it will be appreciated that other output devices such as speech output devices could be used in addition to, or instead of, the display device 55 with little or no additional effort on behalf of the application developer (this support is implemented once within the framework).

Via the GUI interface 60, the user can interact with the system in order to select choices. Selection can be achieved by the user in more than one way, including a standard pointer device such as a mouse 70, a keyboard 80, a speech input device 90, a pen input device 100 or through a touch screen. Whichever way the user makes a selection, the various device drivers will create an event that is handled by the Event Management system 110 of the operating system. Within IBM's OS/2 operating system, the event management function is handled by the operating system and Presentation Manager by provision of a standard control and windowing messaging system.

As will be discussed in more detail later, a selection event is mapped to one of the objects 20 within the actions and properties framework 10. The identifying means 4 identifies that a specific user interaction via a property or action view has occurred, an associated object 20 in memory 15 for the selected action or property is notified of the selection. In the case of an action object, this will cause a routine to be invoked that will perform, under the control of the processor 2, the requested operation defined within the action object (irrespective of how or where the selection event is generated). In some cases, this operation includes first displaying a dialog for presenting certain options to the user or to enable the user to confirm that the operation should be performed, such as when deleting a file.

In the case of a property object, the user's interaction will select or update a property value. An instance of a property object 210 is created which contains all the view attributes that are associated with a specified property. The framework 10 provides an application-extendable predefined set of view attributes 250 for common property types that are stored within the underlying file system 30. This single set of property types are accessible by more than one object or application within the system, and therefore customisation of property type data will affect any object or application that uses these common property types.

User interaction with a property view may initially result in an entry field for setting the property value being displayed to a user. Alternatively, an entry field may be displayed together with a list of selectable property values (for example a list of possible fonts), and with a modifiable default value or saved value displayed in the entry field or otherwise highlighted in the list (for example, point size 10 may be a default for a text font). In other cases, an initial interaction with a property view may automatically modify its value (for example, this may be desirable where the property is a boolean property such as whether Hover Help is active and the view is a check box or toolbar icon). The particular response to the user's interaction depends on the particular methods and view attributes encapsulated within a particular property object and also on the application logic, as will be explained below. The user is able to interact with visual property views to change property values. This will be explained later with reference to FIGS. 5 and 6.

Figure 3:
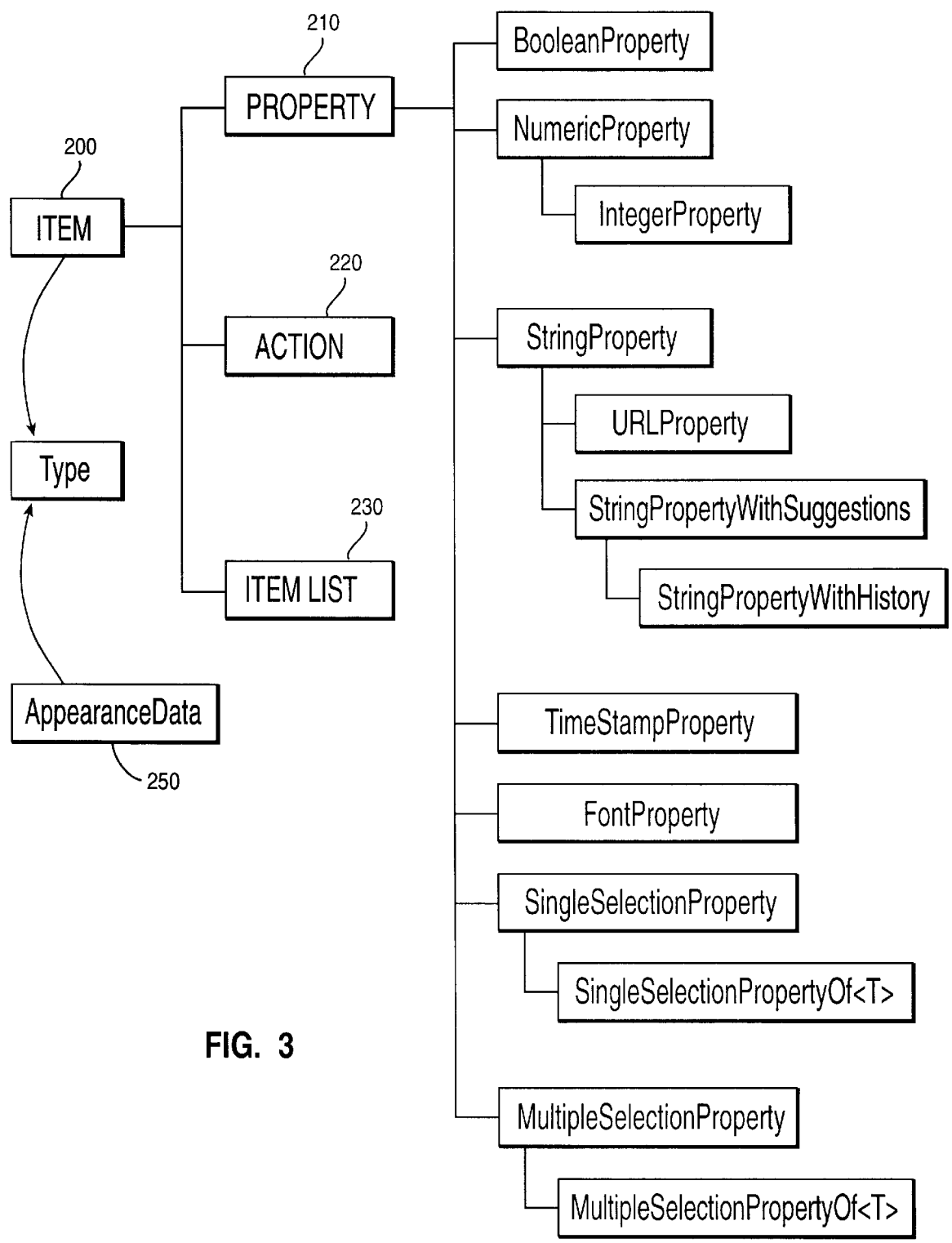
FIG. 3 is an object diagram showing the hierarchy of object classes of an actions and properties framework according to an embodiment of the invention.
Figure 4:
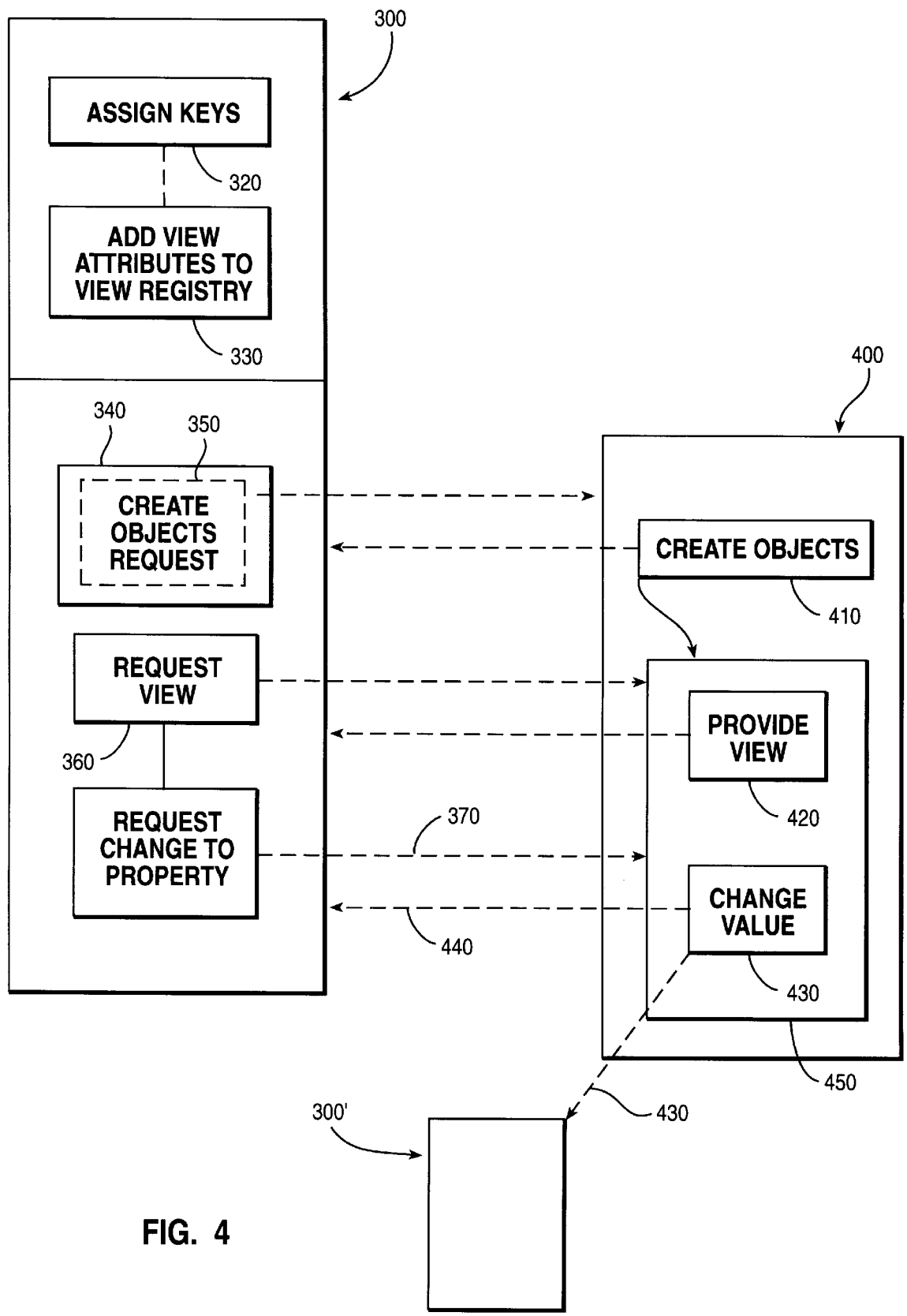
FIG. 4 is a schematic representation of the use of a framework according to an embodiment of the invention.

The objects within the actions and properties framework 10 according to the preferred embodiment will now be discussed in more detail with reference to FIG. 3, which is an object diagram showing the hierarchy of object classes of the framework 10. The set of object classes of the framework includes a base Item class 200 which is 'typed'. That is, each item has a recognisable type that identifies what kind of item it is. An example of a property type is a font selector. An application or component may include any number of font selector property instances, each for selecting fonts for different parts of the interface, but they all have the same type. Each Item also has appearance data. An Appearance-Data class 250 (the view registry) comprises labelled attributes that can be associated with an Item type. Examples of common labels are "Text", "ToolbarGraphic" and "HoverHelp". Thus, visual attributes are held in an object class in association with particular objects according to the object types.

A VisualProperties class 210, an Actions class 220 and an ItemList class 230 inherit from the base Item class. Objects of the VisualProperties class have the following attributes and methods:
    a unique identifier
    a specific property type
    a specific data type
    a specific data value
    a domain (set of possible data values)
    view attributes:
        Menu text and button text;
        Graphic (bitmap or icon);
        Hover Help text;
        Style attributes (such as whether the action is latchable);
    methods which can be performed on the above attributes:
        'set' (change value);
        'get' (find current value);
        'set domain' (set the selectable range of values);
        'get domain' (obtain current domain values);
        'add observer' (record request for specified component to be notified of changes to the property object);
        'remove observer'; and
        'undo' (reset property value to its last value).

An additional method is support for drag and drop manipulation of property views, for example adding a copy of a view to a toolbar. This is implemented to automatically ensure that view concurrency extends to such additional views.

There are many types of visual properties defined within the framework, the various property types having various types of data accessible to users and the types being linked to specific view attributes. These property types are implemented as sub-classes of the PropertiesClass, as follows:

BooleanProperty—properties having 'on' and 'off' data values only;
    IntegerProperty—properties having integers as values;
    NumberProperty—properties having numbers (integer or not) as values;
    StringProperty—properties for which the value is a string (this may take many forms such as an alphanumeric code, text, etc)
    URLProperty—this is an example of a StringProperty where the URL is the value;
    StringPropertywithSuggestions—another example of a StringProperty, but with a list of selectable values displayed as suggestions when the property view is selected;
    StringPropertywithHistory—this is a specific extension of the previous class, with the suggestion being the value of the property when last selected;
    TimeStampProperty—data value is a time;
    FontProperty—values are named text fonts and the data type is text (see example below);
    SingleSelectionProperty—where the property encapsulates a single modifiable data value of type text;
    SingleSelectionPropertyOf<T>—where the property encapsulates a single modifiable data value of any specified data type;
    MultipleSelectionProperty—where there is a plurality of selectable property values of type text;
    MultipleSelectionPropertyOf<T>—where there is a plurality of data values of any specified data type.

Visual properties manage a piece of data—for example a font name property manages a piece of text (the font name). In general, the data can be of any type or object type. The same property type-specific attributes are used in the creation of all instances of a property object and so this data is class-wide for a particular property type. Thus there will be a set of common data for a particular property type even though an application may have different instances of the same property object. As an example, a specific font property object is a font name selector having the following attributes and methods:
    a unique identifier;
    the type 'FontProperty' (although not shown as such in FIG. 3, the 'FontProperty' class is a subclass of the 'SingleSelectionProperty' class);
    the data type 'text';
    the current value 'Helvetica';
    the domain of 'Helvetica, Courier, Times Roman, Sonoran-Serif, Prestige';

view attributes for producing a standardized text representation (the word "font") for use within an input field on a settings page or as a menu item within a drop-down menu; and bitmaps and GUI controls for a graphic representation in a menubar;

the preset methods 'set' and 'get', 'set domain' and 'get domain', 'add observer' and 'remove observer', and 'undo'.

A separate property object is the point size of the font. An example property object instance is defined as follows:

it has a unique identifier;

type 'IntegerProperty';

data type 'integer';

current data value (point size) '12';

domain '10, 12, 14, 16, 18, 20, 22, 24';

view attributes for 'numeric value in an input field';

methods 'set', 'get', 'get domain', 'set domain', (if a font name is changed then the domain of point sizes may change automatically), 'add observer' and 'remove observer'.

The font property object and integer property object class definitions from which the above and other font and font size property object instances are created, including the view attributes for standard views for those objects, are provided by the properties framework. They are stored in system memory 15 (with their access keys obtained at registration—see below) managed by the underlying file system 30 so as to be available for use by application programs written using the properties framework. Defining and registering of property objects and their use will now be described in more detail with reference to FIG. 4 which shows the stages of application installation and application use subsequent to application development.

Firstly, an application developer includes instructions at appropriate points within his/her application program code for requesting creation and requesting modification of property objects. The code for creating these property objects is made a part of the application's start-up procedure. Views are typically provided dynamically by the framework when requested, having been defined or 'created' when a viewer is created. For example a font name selector may be created for a toolbar when the toolbar is created. The requests for creation of a property object define specific properties which the application will require when it is run (specifying the property type required and the relevant viewer, and optionally for standard property types also specifying view attributes for any non-standard views which are required). This is very much simpler for the developer than the steps required to support user-modification of properties according to prior art methods of writing applications.

For example, an application developer requiring a font selector within an application either defines specific font selector property attributes or, much more commonly, decides to use a standard font selector property definition which is provided by the property framework. The developer includes instructions 350 within the application's installation procedures to register required property objects, and calls to create the required property objects at application start-up, and calls for working with the font property objects within the application run-time code. The calls for creating font property objects include a property key which identifies a registered property object to enable access thereto, this identifier key being assigned to the property object as part of the registration step (see below).

An example run-time application call is a call for obtaining the current value of a property, of the form:

String font=fontSelector.getProperty( );

This will return a string which is the font value (name) for this point in the calling application.

Atypically, the developer also includes code within the application for creating new views for a property which are additional to the views predefined by means of view attributes held in the view registry. This is implemented by sub-classing the existing property classes and defining view attributes for a specific subclass. When the developer extends the VisualProperty class in this way when unique views are required, the methods otherwise used to create standard views of the property are overridden. New views on properties are themselves derived from a PropertyView class template. This class, together with the templated VisualProperty class, provide the standard behaviour and functionality (such as drag/drop and concurrency) of visual properties as described above.

Subsequently, when the application program 300 is installed on a computer system, the installation process 310 includes registering the properties defined by the developer that the application will require when it is run. The registering of required property objects includes assigning 320 unique identifier keys to required objects, which keys are then stored to enable components subsequently to access the specific property objects they require. The application code will specify, for example, a requirement for a menubar view of a font selector. Instructions inserted in the application by the developer serve to add 330 an entry for the required property type into a view registry 250 (i.e. putting a set of view attributes for that property type into memory).

The pre-registering of objects which have defined view attributes, referred to above, avoids the need to specify view attributes every time a property instance is created. Associating property types with standard view attributes provides consistency and simplifies development.

When the application 300 is run, it may be necessary for example to query or change the value of a particular property as input to some function. A property object instance 450 is typically created when an application program is initiated 340, the application having previously registered a requirement for that object. The application's start-up procedure 340 includes requests 350 to create property objects which requests include the identifier keys assigned as part of the registration procedure at installation time. The generator within the framework creates 410 property objects 450 with reference to the attributes stored in the view registry for that property type. The created property instances encapsulate the view attributes that were held in the registry for that property object type.

The framework obtains views of properties 420 from the property objects themselves. The application issues requests 360 for the framework to dynamically provide a view of a property, for example requesting the framework's menubar view for a font property selector for a specific piece of text. A user interacts with the property view (for example clicking on a menu bar which then displays text within a drop down menu). If the user then selects a specific property value, the system identifies this as an interaction with the specific property object represented by the particular view at that point in the application. The framework keeps a record of the views it has opened and the specific property objects represented by these specific views.

When a user interaction is recognised as a request to change a property value, a request 370 is issued to the property object. The property object performs the update 430 and issues an event (sends a message) 440 back to the application and to any other associated applications or components 460. A single underlying property object thus holds the property value and state, and all changes to property objects are automatically propagated to all views which are open on the object and to any other components or applications which have requested notification. Not all components which have confirmed their interest in a property have views on that property.

Figure 9A:
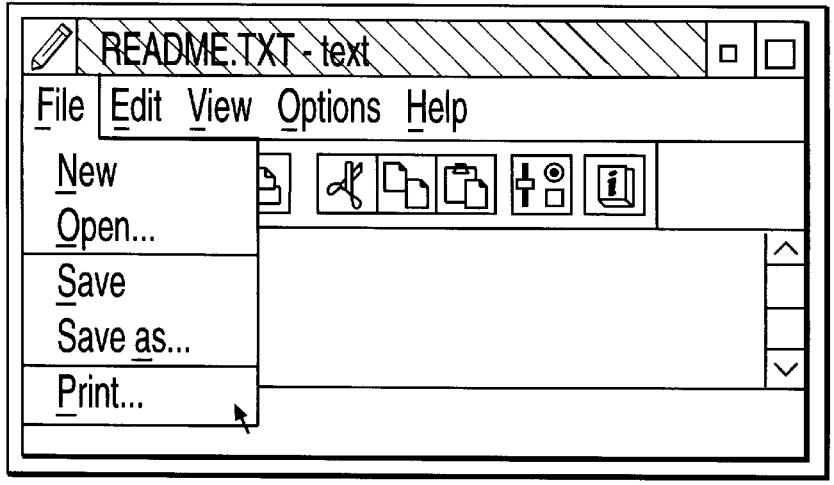
FIGS. 9a to 9f illustrate various examples of visual views used to represent actions and properties.
Figure 9B:
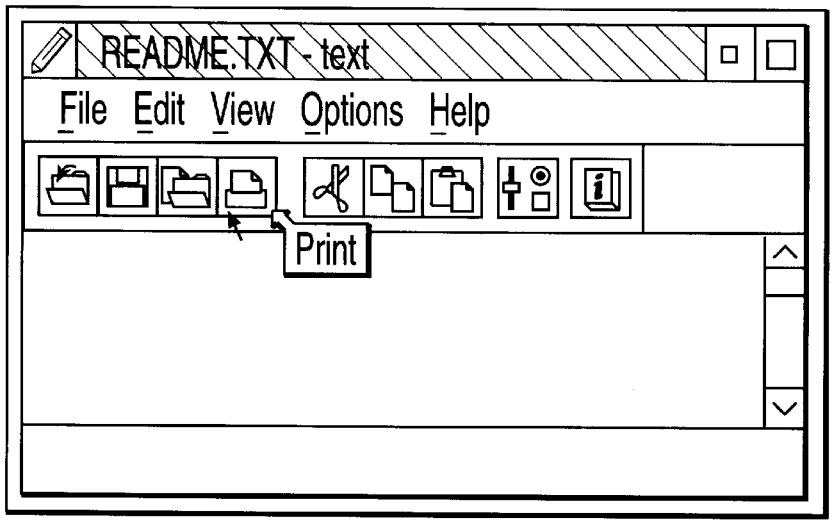
Figure 9C:
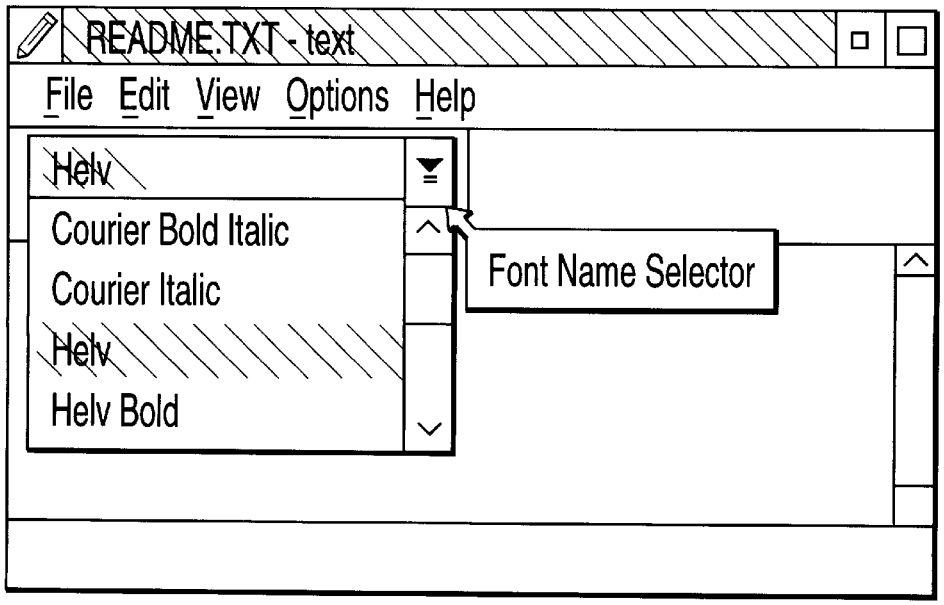
Figure 9D:
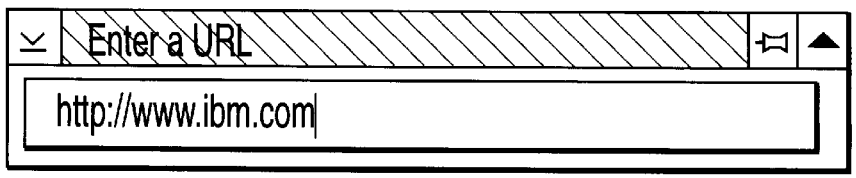
Figure 9E:
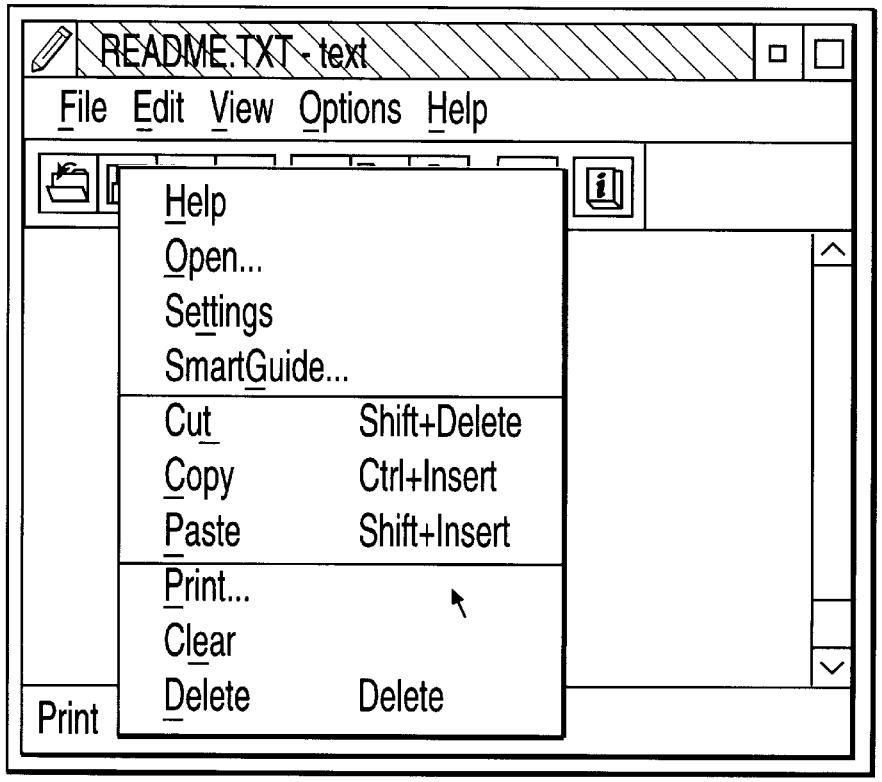
Figure 9F:
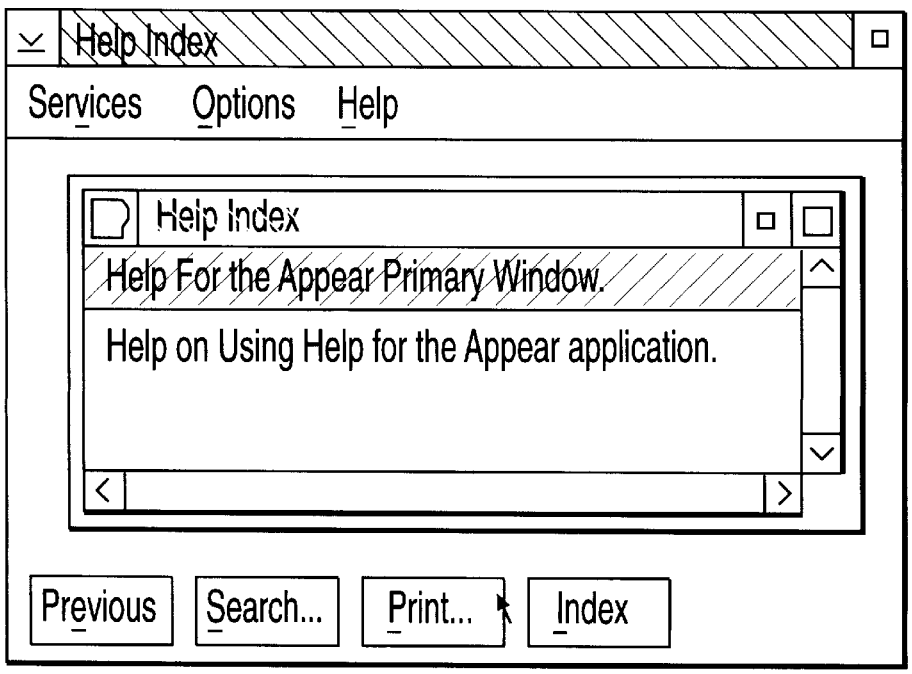

Consider the example where it is required to select a font prior to a printing operation. The initial user interaction may be to select Options from a menu bar (such as shown in FIG. 5b). The user then moves the cursor to select the word Font from the menu list. A pop-up menu listing possible fonts may now be displayed (see FIG. 9c). Let us assume that the user selects the font Helvetica as shown. This interaction with the menu view of the property is identified by the identification logic 4 as a request to change the property value. A message is sent by the framework to the font property object created by or for this print component. This message may take the following form:

fontSelector.setProperty(NewFont);

The identified font property object includes a method to update its property value. The object performs this method and returns a notification to the application. The object sends this notification to all of its associated components or applications, which ensures that all views for this property object are updated.

A property object may be referred to as an 'event sender' or 'notifier' which issues events to all of its 'listeners' or 'observers' when its data value is changed. Other objects are able to enter themselves as observers on the property object, and they will typically be notified whenever the property value of the property object changes (but see next paragraph). Additionally, an object may register interest in the domain of values that the property value is taken from. If this domain changes, then the object is notified. Components are typically observers of the properties they have created. Each item list is an observer of each item (actions, properties and other item lists) it contains, and when it receives an event from such an item it re-issues the event to each of its observers (for example, a toolbar). It also issues an event to all of its listeners whenever its own contents change.

Although components are typically observers of properties that have been created by or for them, if their design requires such immediate response to a property value change, not all components will listen for changes. Some components may only need to query the value of a property when asked to perform some particular function. An example of this may be the interlinear spacing between printed lines of text. A printing component may check this property value using its own methods rather than requiring notification.

Figure 8A:
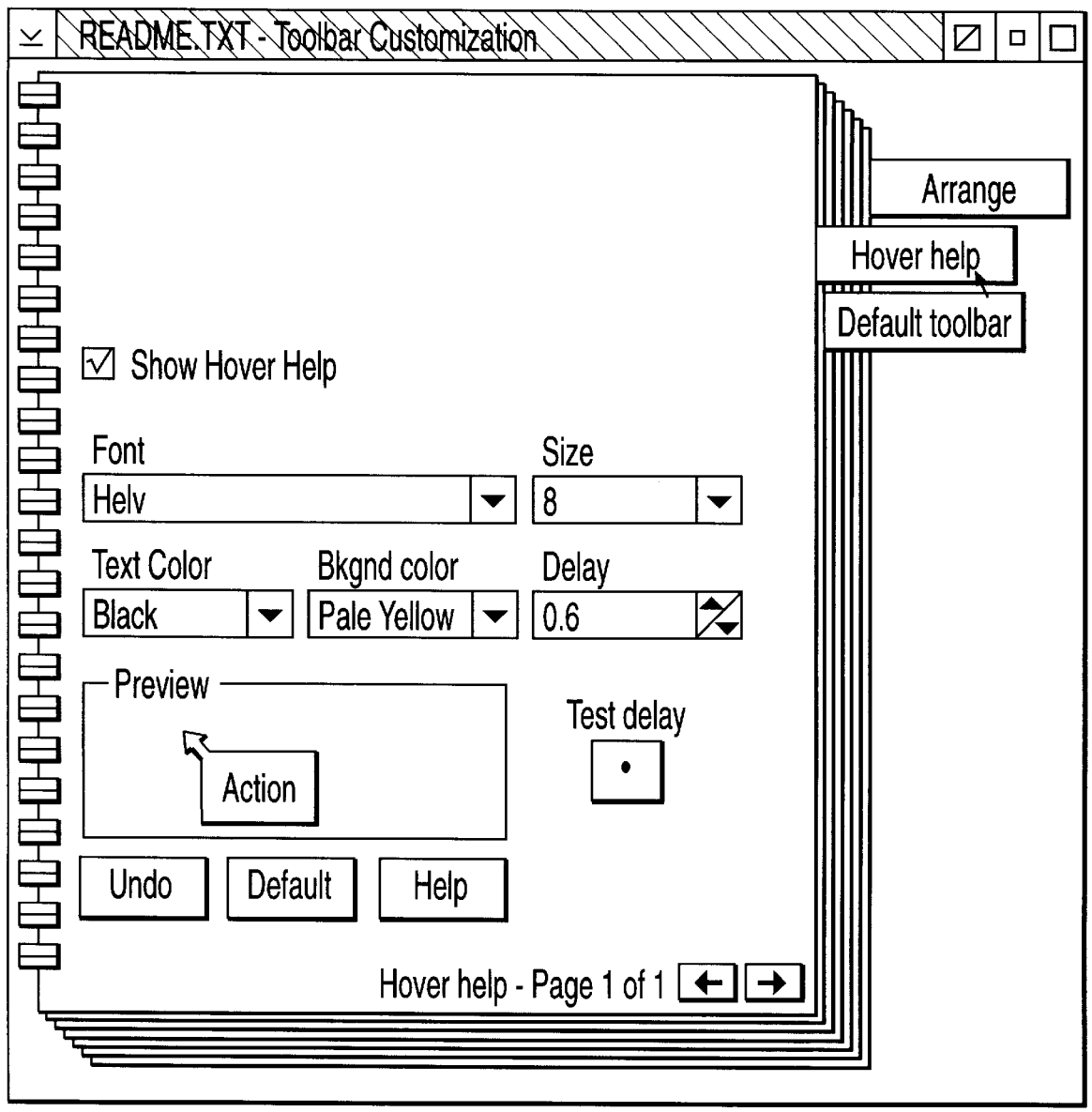
FIGS. 8a and 8b show views of properties associated with a Hover Help component.
Figure 8B:
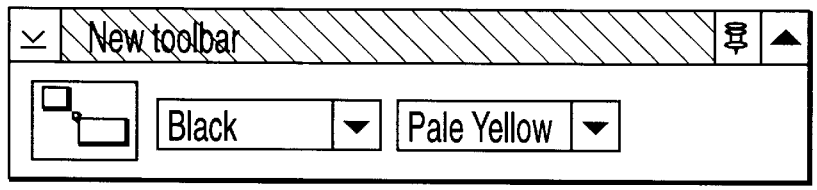

Similarly, the printing of output text in accordance with a selected font will be performed by a printing component and this is one of the observers of a particular font property object. A further example is a component for displaying HoverHelp which displays the HoverHelp text in accordance with a selected font property. A settings page including views of a number of properties associated with the HoverHelp component is shown in FIG. 8a. Visual properties shown in this figure include: a Boolean property for whether HoverHelp should be shown (the view including a text description of the property plus a tick box); scrollable selection fields for each of a font property, a point size property (the domain may be linked to the font), a text colour property, and a background colour property. Another selection field with a spin button allows selection of a delay period property between a cursor moving over a particular feature (such as a toolbar button) and the related Hover Help being displayed. FIG. 8b shows different views on a toolbar of the properties text colour, background colour and the display/not display Boolean property for Hover Help.

Another example component may display animations, with the speed of the animation changing in accordance with a speed property selected via a spin button view. There may be any number of components which are observers of a given property object.

Different applications (and points within an application) may issue requests to different property instances using unique keys—the view attributes will generally be the same but the views and data values may be required to be different. However, it is also possible to share both the appearance and value of a standard property with other applications if all applications use the same key to select the same property. Each will then be interacting with views of the same property object and so will be using and updating the same property value.

As noted, a particular application may have several font properties, for example one for the font in the title of a memo and another for the font of the body of text. Also, there may only be only one font property in a given application but it may be desired for it to be a separate, unique value used only by that application. In these situations, an application developer can register a new property which is a copy of "std_font" and give it a unique key such as:

"MyApp::memoTitleFont" or

"MyApp::memoBodyFont".

The copy is a unique property instance in all respects and its appearance as well as its value can be changed without affecting the appearance of "std_font".

As described above, the generic visual property framework contains visual attributes for providing a standard set of views for a set of standard data/object types. This makes use of the fact that, in the majority of cases, the type of data that a property represents is indicative of the kind of views that can be provided for it.

Figure 5A:
FIGS. 5a to 5c represent particular views on the Boolean property bold text.
Figure 5B:
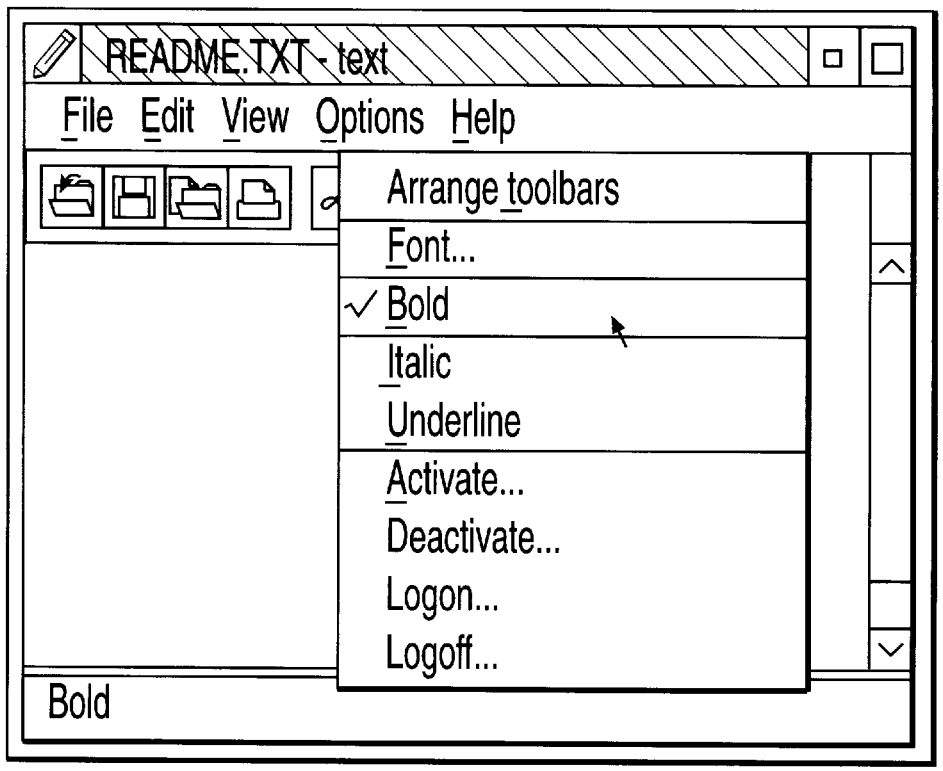
Figure 5C:
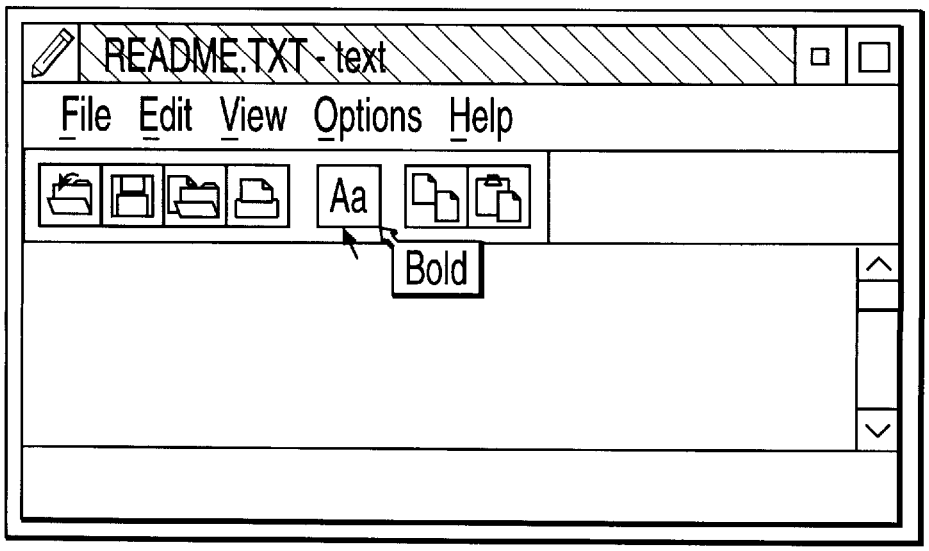
Figure 6A:
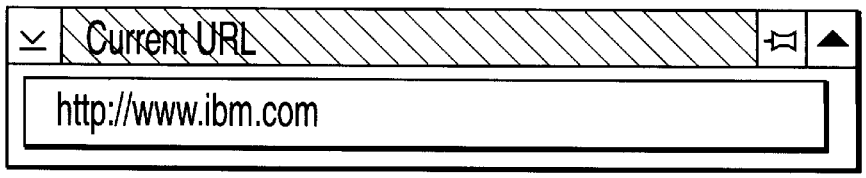
FIG. 6a represents an entry field showing text of a URL property.

Taking a first example, the framework according to the preferred embodiment of the invention includes a standard pre-defined set of views for Boolean visual properties. That is, all necessary view attributes for providing these views are stored in the View Registry of the framework. The standard views that are automatically provided are shown in FIGS. 5a–5c:

a window view of a check box control that has the option of displaying the property name ('Bold' in this example) beside it (FIG. 5a).

a menu view which includes the property name. The menu bar view displays this name with a tick next to the text if the value is 'on' and with the menu item latched down (FIG. 5b).

a toolbar view which displays a latched toolbar button that displays a graphic associated with the property. The latched down position indicates that the value is 'on' (FIG. 5c).

If the developer wants to add to these standard views then a mechanism exists within the property class to provide non-standard views for any property type. For example, a developer may wish to show two graphic images to indicate the on and off states of a Boolean property, or a set of animated images when a mouse moves a cursor over the property view.

Figure 6B:
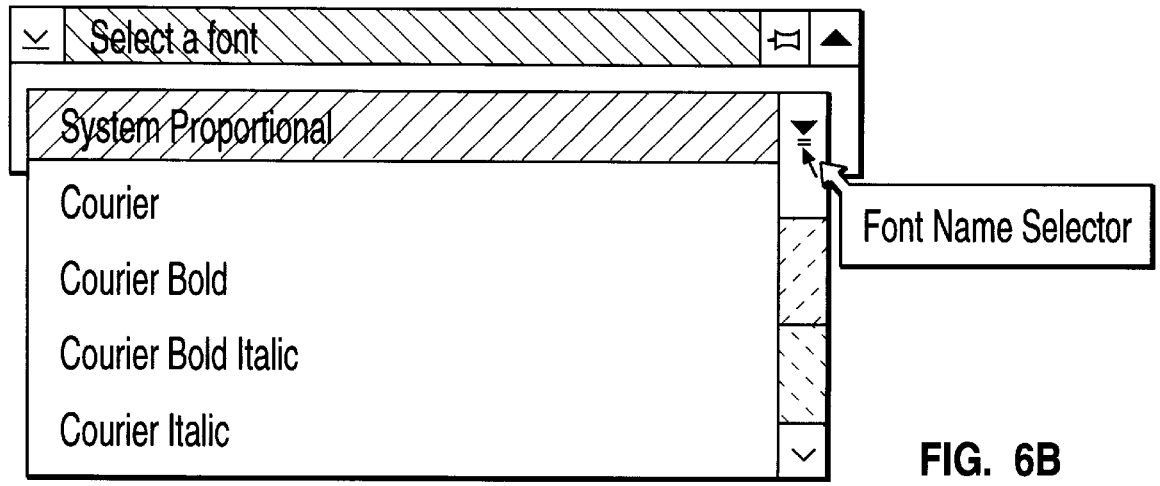
FIG. 6b represents a combination box for a font selector property.

As further examples, the actions and properties framework includes pre-defined views for string visual properties including a URL entry field view for inputting URLs as the data values (FIG. 6a); and a combination box view displaying choices that the user can select from (FIG. 6b shows an example combination box view of a font selector property, showing a current value and possible alternatives). Attributes for presenting each of these views are stored in the view registry keyed by property type.

The class StringPropertyWithSuggestions has standard views stored in the View Registry including the combination box presenting a selectable list. The derived class StringPropertyWithHistory is also defined within the framework and has attributes for presenting a combination box view. In this case, the user is presented with an identified current value which is the last selected value, together with a list of previously selected or entered values. In the preferred embodiment, the property view for this class is initially an entry field. After the first time the user changes the value, a drop down combination box is provided that displays the previous values that were entered. Application developers are required to specify a numeric value that limits the maximum number of strings which are to be displayed in this list. The oldest value is removed from the list each time a new value is entered.

Since properties have a standard set of operations that can be applied to them, the access methods of get and set are automated within the framework as methods of the Properties class. Also automated are the undo method, that resets the property value to its last value, methods for adding and removing observers to the property object. A standardised method of validating a property may also be provided and a connection point for the necessary logic to validate a particular property value is a feature of the framework according to the preferred embodiment.

Properties are enabled to automatically save themselves persistently and restore themselves next time the application is started. Whatever value the property had when saved is restored. This means that a property object according to the preferred embodiment is a complete solution for any user-configurable data which an application needs to keep.

Figure 7:
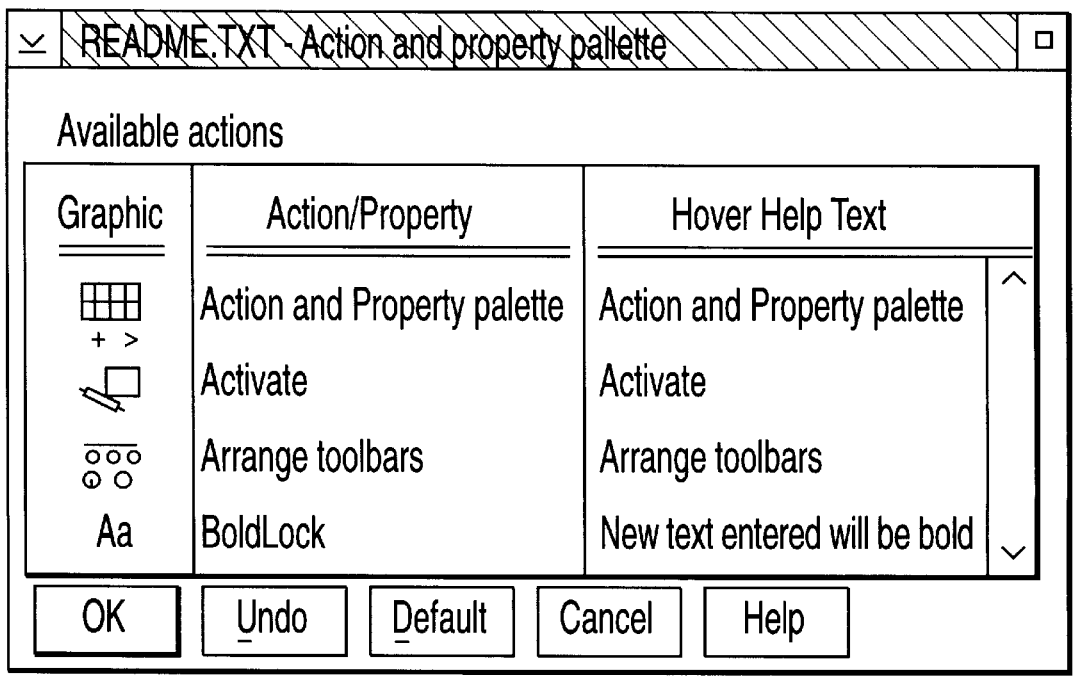
FIG. 7 shows a Boolean visual property of Boldlock appearing in an action and property palette.

Property objects also provide automatic direct manipulation support to the end user and application developer. Property objects support multiple views so that is they are contained within a dialog or settings notebook the user can drag a copy of the property setting off the dialog or settings page and promote the property to a toolbar. Visual properties can be displayed alongside actions within an action and property palette, enabling a user to drag any of these items from the available palette list onto the toolbar or any other viewer that understands these objects. This mechanism allows the user to choose which properties they wish to promote to the toolbar, avoiding developers permanently setting the contents of a toolbar in accordance with their best guess as to which settings a user will wish to work with the most. FIG. 7 shows a Boolean visual property of Boldlock appearing in an action and property palette.

Since property objects are typed (each instance of a property being associated with a named identifier), it is possible to create a single property representation based on the type identifier to match to a number of property instances. A single settings page or dialog can thus be provided that is applicable to a number of different components. The properties within all settings pages can be merged, and where properties are of the same type, a merged visual property can be generated to represent both property instances. Changes made via such a merged property view are propagated to the original property objects and thus to each selected component. This greatly increases the useability of the interface and reduces the number of steps the user has to go through to change settings.

The same problem occurs in the prior art for nested (embedded) components. Property objects and the same merge mechanism described above will solve this problem as well.

The present invention, in its preferred embodiments, thus provides a number of advantages over the prior art. It provides a single mechanism to represent a property data value with a set of visual attributes. It allows a number of different views to be available for a single property and automatically handles view concurrency. It adds automatic persistence of the property value across sessions. It manages the automatic copying of property views by the user using direct manipulation, such that the user can promote commonly used properties to a toolbar. It provides a mechanism to merge settings into a single interface as a result of selection of multiple components, and automatically generates the multiple events back to the selected objects. It provides a predefined standard set of property types with a standard set of views that can represent that type. This is a specific advantage for a developer as it greatly increases the amount of time it takes to create properties that are customisable. It provides the ability for a developer to define specific views on properties or custom controls if required.

A particular embodiment of the present invention is a combined action and properties framework. In such a framework, a single mechanism is also provided for dealing with actions. This mechanism takes the form of an OOP object (the 'action object') which defines, for each available view that can be employed to represent that action, the attributes required to provide that view, and an identifier to identify the operation to be invoked upon selection of the action. This action object defines, for each available user selection mechanism (or 'view') that can be employed to represent that action, a) the attributes required either to construct a visual representation of the action for visual user selection or to construct other representations that enable selection through non-visual mechanisms, and b) an identifier to identify the operation to be invoked upon selection of the action. Preferably this identifier consists of a unique identifier for the action object selected, and an application call back mechanism that is automatically invoked when the action is selected in order to cause the desired operation to take place. By such an approach, an application can define a single entry point to be defined when an action is selected without having to be aware of which input mechanism generated the call (eg mouse, keyboard, speech input, etc) or from which view the action was selected.

Additionally, in preferred embodiments, the action object defines the current state of the action, such as whether it is enabled, disabled, latched or undefined. The state of an action describes its visible state on associated visual action views and whether the action is selectable from non-visual views. The enabled state indicates that the action is currently available but not selected. The latched state indicates that the action is latchable and therefore can apply to further interactions within an application without explicitly being selected again. An example of this is the 'Bold' action within a word processor. If this action is latched, further data entry by the user will result in the Bold attribute being added to the new text. A disabled state indicates that the action is currently unavailable. An undefined state indicates that the current user selection has an indeterminate meaning to the action. An example of this, again within a word processor, is when the user selects a number of sentences, each with different fonts. The 'Font Selection' action might normally offer visual feedback of the currently displayed font within a font selection view, but in this case the state of the action is undefined because the action cannot determine the correct feedback to give to the user.

By removing this functionality from the individual selection and input mechanism where it is typically provided in prior art systems, the single action object can take the responsibility of notifying all the views from which it is currently available of any change in state. This removes an amount of view concurrency logic from the application code. The operation of providing standard techniques for a notification framework between objects is generally known in the art. For example, within the IBM Visual Age C++ product, classes are provided that perform this function. Other classes can pick up this behaviour by using the standard OO technique of inheriting from Observer and Notifier classes.

What is claimed is:

1. A computer system having a user interface through which a user can change values of properties associated with components or applications, the properties being selectable by one or more views provided via the user interface, wherein the system includes:

means for identifying certain user interactions as requests to change a property value;

means for managing properties as object-oriented property objects of a properties class, the object-oriented property objects encapsulating property values and view attributes for providing said one or more views, said property objects assigned identifier keys during a registration process, the managing of object-oriented property objects including changing an encapsulated property value by directly transmitting messages from the user interface to the object-oriented property objects in response to said chance requests using said identifier keys;

wherein object-oriented property objects each maintain a list of the views which are open on that object-oriented property object and wherein object-oriented property objects are responsive to copying of a property view from a first position in a user interface to a second position in a user interface to automatically update the respective object-oriented property object view list.

2. A computer program product having computer program code recorded on a data carrier, for use with a computer system providing a user interface for user interaction, comprising:

means for managing properties as object-oriented property objects in the computer program code associated with applications or components installed on said system, said object-oriented property objects assigned identifier keys during a registration process, said object-oriented property objects encapsulating property values and view attributes for providing one or more views of the property via the user interface, the managing of object-oriented property objects including changing said encapsulated property values by directly transmitting messages to said object-oriented property objects in response to requests from said associated applications or components using said identifier keys;

wherein object-oriented property objects each maintain a list of the views which are open on that object-oriented property object and wherein object-oriented property objects are responsive to copying of a property view from a first position in a user interface to a second position in a user interface to automatically update the respective object-oriented property object view list.

* * * * *